(12) United States Patent
Yokoyama et al.

(10) Patent No.: US 10,139,630 B2
(45) Date of Patent: Nov. 27, 2018

(54) IMAGE DISPLAY DEVICE WITH OPTICAL SYSTEMS TO GUIDE LIGHT TO A PUPIL

(71) Applicant: SEIKO EPSON CORPORATION, Tokyo (JP)

(72) Inventors: Osamu Yokoyama, Shiojiri (JP); Masatoshi Yonekubo, Hara-mura (JP); Takashi Takeda, Suwa (JP); Daisuke Ishida, Fujimi-machi (JP); Mitsutaka Ide, Shiojiri (JP); Hidemitsu Sorimachi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/514,627

(22) PCT Filed: Sep. 17, 2015

(86) PCT No.: PCT/JP2015/004747
§ 371 (c)(1),
(2) Date: Mar. 27, 2017

(87) PCT Pub. No.: WO2016/051706
PCT Pub. Date: Apr. 7, 2016

(65) Prior Publication Data
US 2017/0227776 A1    Aug. 10, 2017

(30) Foreign Application Priority Data
Oct. 2, 2014    (JP) ................. 2014-203701

(51) Int. Cl.
*G02B 27/01*      (2006.01)
*H04N 5/64*       (2006.01)
(Continued)

(52) U.S. Cl.
CPC .......... *G02B 27/0172* (2013.01); *G02B 5/32* (2013.01); *G02B 6/0005* (2013.01);
(Continued)

(58) Field of Classification Search
None
See application file for complete search history.

(56) References Cited

U.S. PATENT DOCUMENTS 5,535,025 A    7/1996    Hegg
5,576,887 A    11/1996   Ferrin et al.
(Continued)

FOREIGN PATENT DOCUMENTS

JP    H07-72422 A    3/1995
JP    2006-53384 A   2/2006
(Continued)

OTHER PUBLICATIONS

Dec. 8, 2015 International Search Report issued in International Patent Application No. PCT/JP2015/004747.
(Continued)

*Primary Examiner* — Jennifer D. Carruth
(74) *Attorney, Agent, or Firm* — Oliff PLC (57) ABSTRACT

An image display device with which it is possible to visually recognize an image while securing the see-through property regardless of eye movements and changes in interpupillary distance, with which it is possible to display a large-size image with high quality, and which is small, has excellent wearability, and has an excellent external appearance.

5 Claims, 4 Drawing Sheets

(51) Int. Cl.
- *G02B 5/32* (2006.01)
- *F21V 8/00* (2006.01)
- *G02B 27/00* (2006.01)
- *G02B 26/08* (2006.01)
- *G02B 26/10* (2006.01)

(52) U.S. Cl.
CPC ....... *G02B 26/0833* (2013.01); *G02B 26/101* (2013.01); *G02B 27/0025* (2013.01); *G02B 27/0081* (2013.01); *H04N 5/64* (2013.01); *G02B 2027/011* (2013.01); *G02B 2027/0145* (2013.01); *G02B 2027/0174* (2013.01); *G02B 2027/0178* (2013.01)

(56) References Cited

U.S. PATENT DOCUMENTS

| | | |
|---|---|---|
| 5,742,262 A | 4/1998 | Tabata et al. |
| 2006/0131492 A1 | 6/2006 | Kobayashi et al. |
| 2007/0291355 A1 | 12/2007 | Tanijiri |
| 2010/0060551 A1 | 3/2010 | Sugiyama et al. |
| 2011/0050655 A1 | 3/2011 | Mukawa |
| 2011/0216422 A1 | 9/2011 | Nakazawa |
| 2013/0222384 A1* | 8/2013 | Futterer .................. G02B 5/32 345/426 |

FOREIGN PATENT DOCUMENTS

| | | |
|---|---|---|
| JP | 2006-178033 A | 7/2006 |
| JP | 2011-070141 A | 4/2011 |
| JP | 2011-180415 A | 9/2011 |
| JP | 2012-013908 A | 1/2012 |
| JP | 2013-080039 A | 5/2013 |
| WO | 2009/041055 A1 | 4/2009 |

OTHER PUBLICATIONS

Jun. 18, 2018 Search Report issued in European Patent Application No. 15846815.7.

* cited by examiner

IMAGE DISPLAY DEVICE WITH OPTICAL SYSTEMS TO GUIDE LIGHT TO A PUPIL

TECHNICAL FIELD

The present invention relates to an image display device.

BACKGROUND ART

In recent years, an image display device which is used in a state of being worn on a head portion of a viewer such as a head mounted display is provided as a wearable information device. For example, PTL 1 which is described below discloses a video display device which is provided with a light source, a display element which modulates light from the light source and displays a video, and a viewing optical system which guides the video light from the display element to a pupil of the viewer. In the video display device, a holographic optical element is disposed in front of the eyes of the viewer, and the holographic optical element transmits light from the outdoor scenes. Accordingly, the viewer is capable of visually recognizing an image of the outdoor scenes in addition to a video from the display element. An image display device with which it is possible to visually recognize both a video from a display element and an image of the outdoor scenes may also be referred to as a see-through type image display device hereinafter. In the video display device, since only the holographic optical element has an optical power, it is difficult to correct aberration and distortion which are caused by the holographic optical element. Therefore, it is difficult to display an image with a wide angle of view at a high resolution, that is, an image of a large size.

In PTL 1, a liquid crystal display element is given as an example of the display element; however, in a case in which a device which has a two-dimensional external shape such as a liquid crystal display element is used, there is a problem in that the size of the display element becomes great. In order to reduce the size of the display element, PTLs 2 and 3 which are described below disclose an image display device which is provided with scanning means for driving a mirror to two-dimensionally scan light. However, in the device of PTL 2, in a case in which the diameter of the laser beam to be scanned is narrow, there is a problem in that the laser beam shifts from the position of the pupil when the eye is moved, and the image becomes invisible. Additionally, since the interval between the right eye and the left eye, the so-called interpupillary distance differs depending on the person, there is a problem in that when the user changes, the image becomes invisible.

On the other hand, PTL 3 discloses an image display device in which light deflecting means is provided in a light emission region of a light guide plate which guides scanned light to the front of an eye, and an image is visible even if the eye moves due to spreading the image light over the entirety of the light emission region and emitting the image light. Hereinafter, a function of magnifying the exit pupil by spreading the image light in this manner will be referred to as a pupil magnifying function. However, in the device of PTL 3, since the light guiding plate also stretches outside of the region in front of the eyes of the viewer which is necessary for the image display and the light guiding plate overhangs the side of the face, the device increases in size, and this is not preferable from the standpoint of external appearance.

PTL 4 discloses a video display device which includes a pupil magnifying function in a case in which an ocular optical system is formed of a mirror which is disposed in front of the eye. Specifically, in the video display device, a diffraction grating is disposed between a concave mirror and the eye, and the pupil magnifying function is exhibited by dividing the light which is reflected by the concave mirror into plurality of pencils of rays. However, in this configuration, since the diffraction grating is displaced in front of the eyes of the viewer, the see-through property is impaired.

CITATION LIST

Patent Literature

PTL 1: Japanese Unexamined Patent Application Publication No. 2012-13908
PTL 2: International Publication No. 2009/041055
PTL 3: Japanese Unexamined Patent Application Publication No. 2011-70141
PTL 4: Japanese Unexamined Patent Application Publication No. 7-72422

SUMMARY OF INVENTION

Technical Problem

As described above, in the image display devices of PTLs 1 to 4, there are various problems in that it is difficult to display an image with high resolution and large size, the image becomes invisible due to eye movement or a change in interpupillary distance, the image display device becomes large which is not preferable from the standpoint of external appearance, the see-through property is impaired, and the like.

An aspect of the invention is made in order to solve the problems described above, and an object thereof is to provide an image display device with which it is possible to visually recognize an image while securing a see-through property regardless of movement of an eye and changed in interpupillary distance, with which it is possible to display an image of a large size at high quality, and which is small and has excellent wearability and external appearance.

Solution to Problem

In order to achieve the object described above, an image display device of an aspect of the invention includes a light source optical system which emits a light, a mirror which reflects the light which is emitted from the light source optical system, a light scanning device which scans the light which is reflected by the mirror to use the light as image light, a pupil magnifying optical system which magnifies a beam diameter of the light which is emitted from the light scanning device, a correcting optical system on which the light which is emitted from the pupil magnifying optical system is incident and which corrects shape and aberration of the image light, and a deflecting optical system which deflects the light which is emitted from the correcting optical system to guide the light to a position of an exit pupil and transmits a portion of external light.

In the image display device of an aspect of the invention, image light is generated by scanning light which is emitted from the light source optical system using the light scanning device. Since the mirror which reflects the light which is emitted from the light source optical system is provided, the optical path between the light source optical system and the light scanning device is turned back. Accordingly, it is possible to reduce the size of the optical system which generates the image, and the feel of wearing is excellent due to the center of gravity of the image display device being positioned at the rear side (the side which is close to the ears of the viewer). Since the pupil magnifying optical system is positioned on the optical path between the light scanning device and the correcting optical system, the pupil magnifying optical system may be configured so as not to be positioned in front of the eyes of the viewer. Accordingly, it is possible to secure a see-through property while having a pupil magnifying function which is capable of reducing the influence of eye movement and interpupillary distance fluctuation.

The diameter of the light which is incident on the deflecting optical system is enlarged by the action of the pupil magnifying optical system. At this time, even if the design of the deflecting optical system is optimized, the aberration and distortion may not be completely corrected using the deflecting optical system alone, in particular, in a case in which the size of the image is large, that is, the angle of view is large, the quality of the image may be reduced. In this regard, since the image display device of an aspect of the invention is provided with the correcting optical system which corrects the shape and the aberration of the image light, the aberration and distortion which are caused by the deflecting optical system, for example, are corrected, and a high-quality image may be obtained. In this manner, according to an aspect of the invention, it is possible to provide an image display device with which it is possible to visually recognize an image while securing a see-through property regardless of movement of an eye and changes in interpupillary distance, with which it is possible to display an image of a large size at high quality, and which is small and has excellent wearability and external appearance.

In the image display device of an aspect of the invention, the deflecting optical system may be formed of a holographic mirror.

Even if the light is incident at a sufficiently large incidence angle, the holographic mirror is capable of reflecting the light to the front side, and is capable of guiding the reflected light to the exit pupil. Therefore, by forming the deflecting optical system using the holographic mirror, it is possible to dispose the deflecting optical system at an angle close to perpendicular in relation to the optical axis of the exit pupil, and it is possible to reduce the thickness of the part of the image display device which is positioned in front of the eye. As a result, it is possible to realize an image display device with an excellent external appearance.

In the image display device of an aspect of the invention, the correcting optical system may be provided with a plurality of lenses, and at least one lens among the plurality of lenses may have a wedge shape in which a thicknesses on a side which is close to the exit pupil is thick, and a thicknesses of a side which is distant from the exit pupil is thin.

According to this configuration, it is possible to bend the optical axis of the correcting optical system in a direction which fits the head portion of the viewer. As a result, it is possible to dispose the optical system of the entirety of the image display device so as to fit the head portion, and it is possible to realize an image display device with an excellent external appearance and an excellent feel of wearing.

In the image display device of an aspect of the invention, a cross-sectional shape of the pupil magnifying optical system may be a trapezoid, and the pupil magnifying optical system may be disposed in an orientation such that of two sides which are disposed parallel to each other in the trapezoid, a short side is positioned at a side which is close to the exit pupil, and a long side is positioned at a side which is distant from the exit pupil.

According to this configuration, it is possible to bend the optical axis of the optical system in a direction which fits the head portion of the viewer using the pupil magnifying optical system. As a result, it is possible to realize an image display device with an excellent external appearance and excellent feel of wearing.

In the image display device of an aspect of the invention, the mirror may be disposed to be inclined such that an optical path of the light which is incident from the light source optical system and is reflected by the mirror is positioned on a side which is separated from the exit pupil in relation to an optical path of the light which is incident on the mirror.

According to this configuration, it is possible to dispose the light scanning device at a position which is further from the head portion of the viewer than the light source optical system. As a result, it is possible to reduce the thickness of the portion of the image display device which is positioned in the temporal region, and it is possible to realize an image display device with an excellent external appearance and an excellent feel of wearing.

In the image display device of an aspect of the invention, the light source optical system may include a light source unit, an optical fiber which propagates the light from the light source unit, and a collimator lens onto which the light which is emitted from the optical fiber is incident.

According to this configuration, it is possible to dispose the light scanning device at a position which is further from the head portion of the viewer than the light source optical system. As a result, it is possible to reduce the thickness of the portion of the image display device which is positioned in the temporal region, and it is possible to realize an image display device with an excellent external appearance and an excellent feel of wearing.

DESCRIPTION OF EMBODIMENTS

Hereinafter, description will be given of the embodiment of the invention using FIGS. 1 to 4.

The image display device of the present embodiment is an example of a head mounted display which a user wears on the head of the user to use.

In the following description, head mounted display (Head Mounted Display) will be shortened to HMD.

Figure 1:
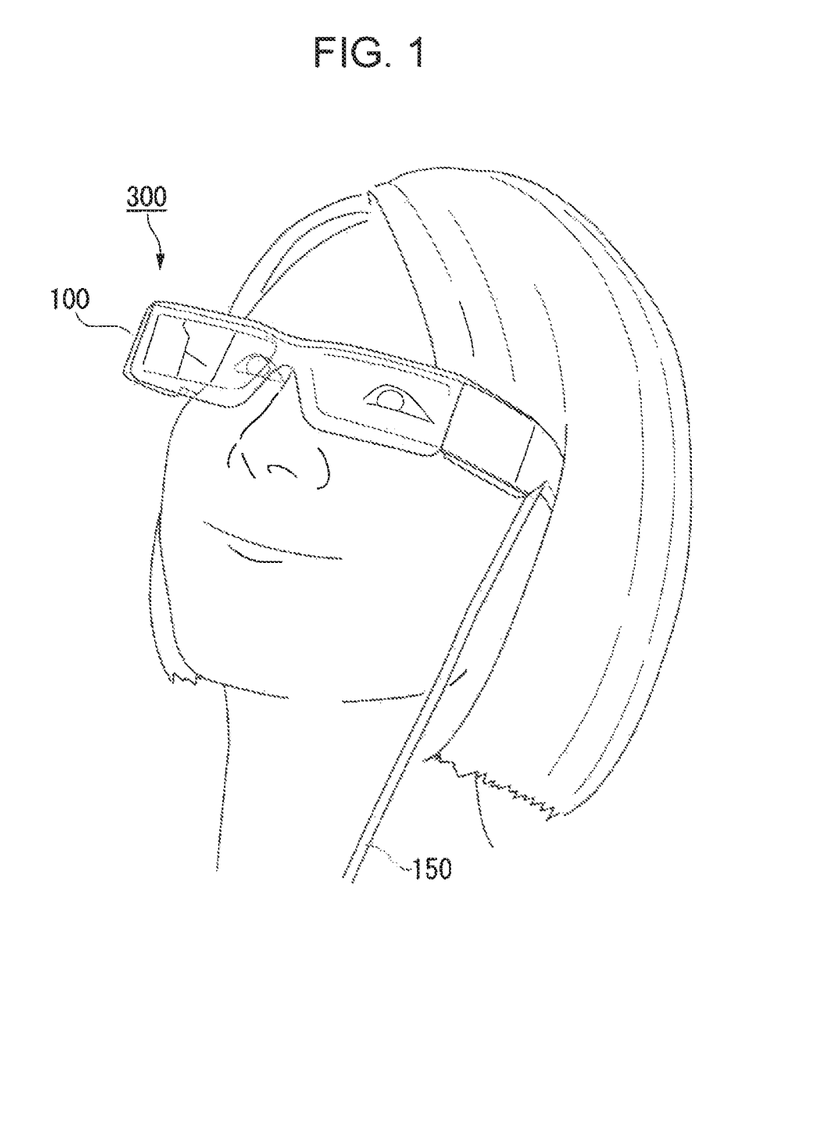
FIG. 1 is a diagram illustrating a state in which a user wears an image display device of an embodiment of the invention.

FIG. 1 is a diagram illustrating a state in which the user wears the HMD of the present embodiment.

Figure 2:
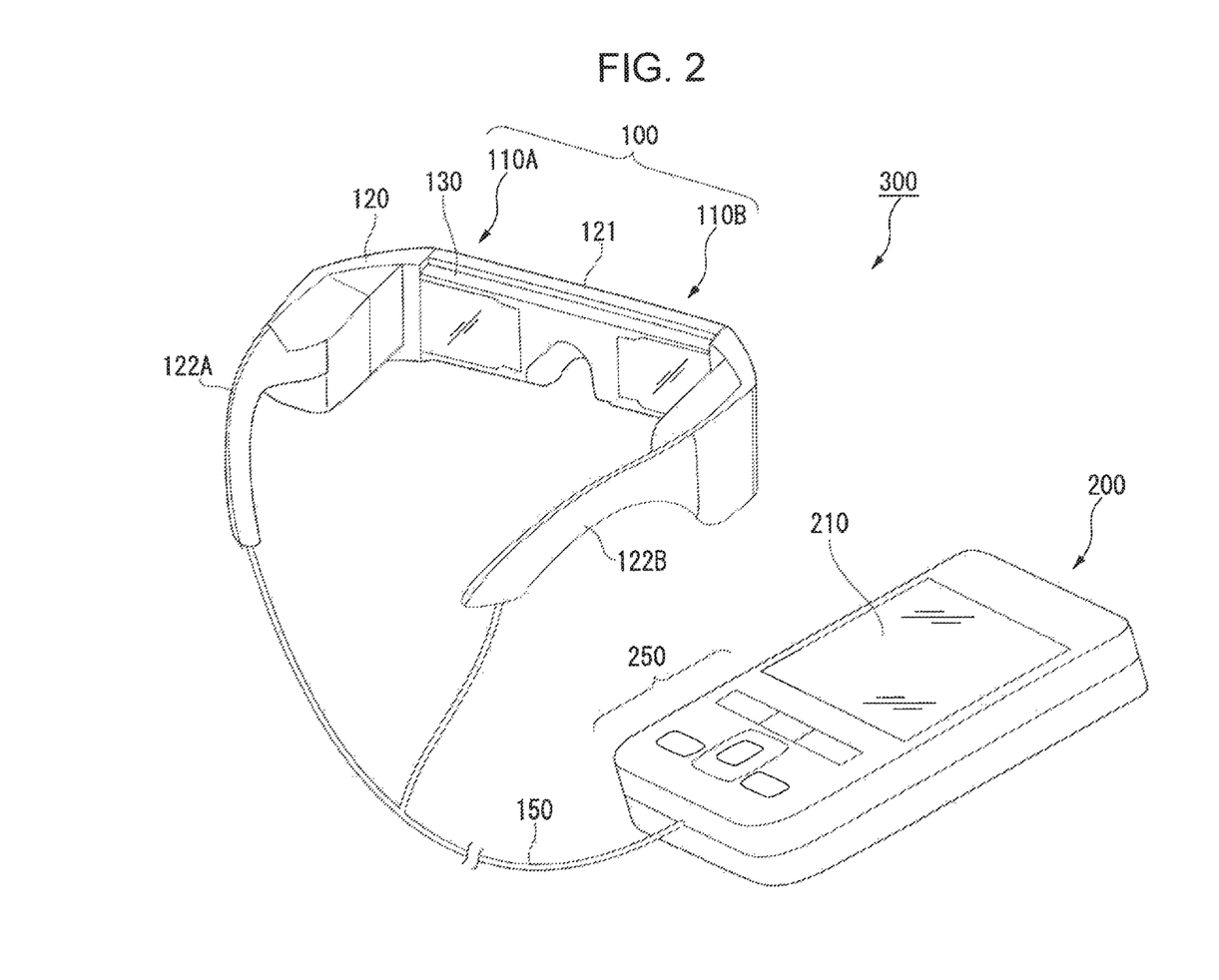
FIG. 2 is a perspective diagram of an entirety of the image display device.

FIG. 2 is a perspective diagram of the HMD of the present embodiment.

The dimensions may be illustrated at different scales depending on the configuration element in order to render the configuration elements easier to view in all of the following diagrams.

As illustrated in FIG. 1, an HMD 300 of the present embodiment is worn on the head portion and used by the user with the feeling of wearing eyeglasses. The HMD 300 of the present embodiment is a see-through type (transmitting type) HMD. According to the HMD 300 of the present embodiment, the user is capable of visually recognizing an image which is generated by an image display unit, and is also capable of visually recognizing an image of the outdoor scenes such as the scenery which is external to the HMD 300.

As illustrated in FIG. 2, the HMD 300 is provided with a display device 100 which has a shape which is similar to eyeglasses, and a control device (a controller) 200 which has a size of a degree a user may hold using a hand of the user. The display device 100 and the control device 200 are connected in a wired or a wireless manner to be capable of communication. In the present embodiment, each of a left eye image display unit 110A and a right eye image display unit 110B which form the display device 100, and the control device 200 are connected in a wired manner via a cable 150 to be capable of communication, and communicate image signals, control signals, and the like.

The display device 100 is provided with a main frame 120, a sub-frame 130, the left eye image display unit 110A, and the right eye image display unit 110B. The control device 200 is provided with a display unit 210, and an operation button unit 250. The display unit 210 displays various information, instructions, and the like to be provided to the user, for example. The main frame 120 is provided with a rim portion 121, and a pair of temple portions 122A and 122B for the user to wear on the ears of the user. The sub-frame 130 is a member which supports the left eye image display unit 110A and the right eye image display unit 110B.

Figure 3:
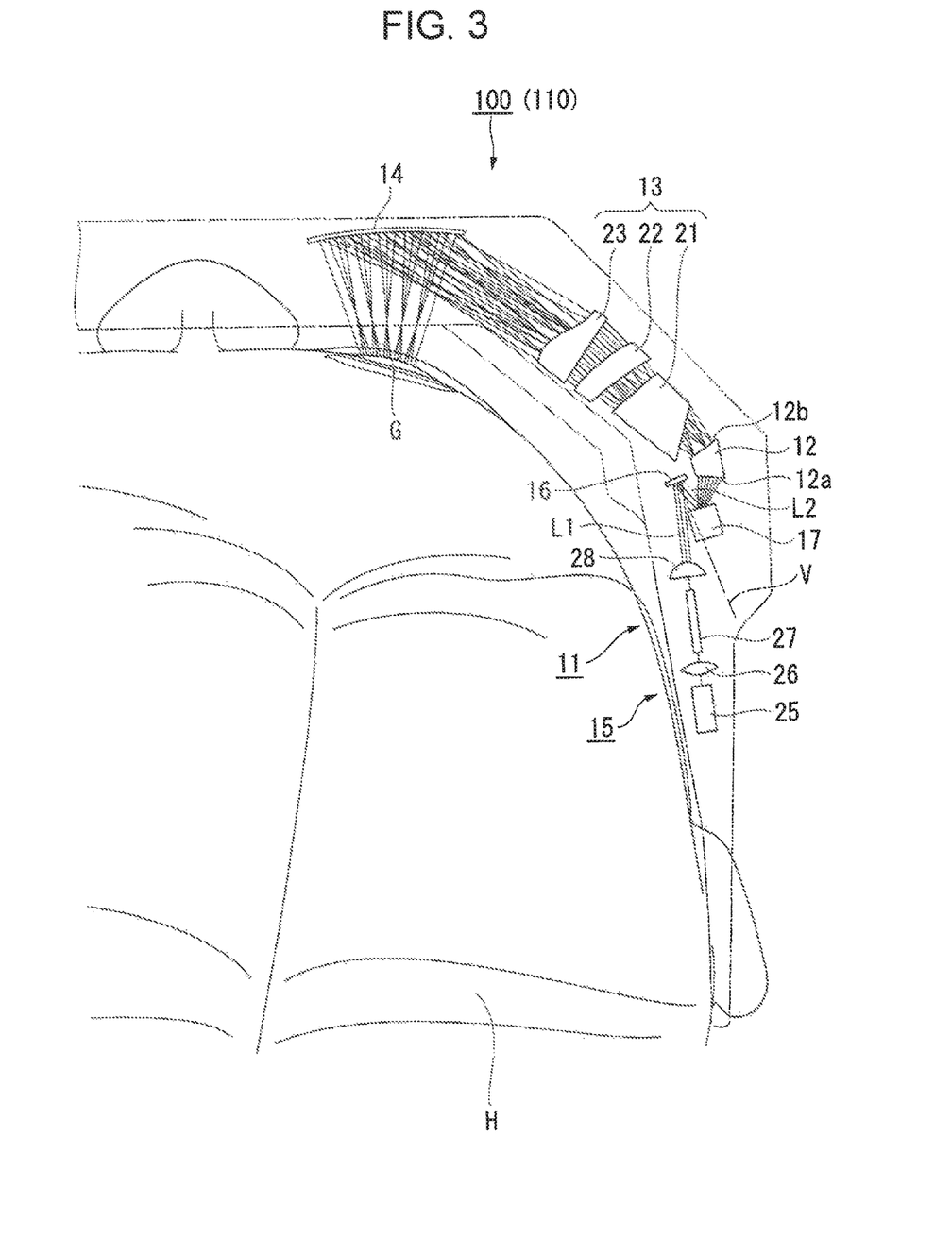
FIG. 3 is a plan view illustrating the configuration of the image display device.

FIG. 3 is a plan view illustrating the configuration of the portions of the display device 100. FIG. 3 illustrates a state of the user wearing the display device 100 as viewed from above the head.

The right eye image display unit 110B and the left eye image display unit 110A have the same configuration, and the configuration elements inside both the image display units are disposed to be left-right symmetrical. Therefore, hereinafter, detailed description will be given of the right eye image display unit 110B simply as the image display unit 110, and description of the left eye image display unit 110A will be omitted.

As illustrated in FIG. 3, the image display unit 110 is provided with an image generating unit 11, a pupil magnifying optical system 12, a correcting optical system 13, and a holographic mirror 14. The image generating unit 11 emits light which includes image information. The pupil magnifying optical system 12 magnifies the beam diameter of the light which is emitted from a light scanning device 17 which is described later. The light which is emitted from the pupil magnifying optical system 12 is incident on the correcting optical system 13, and the shape and the aberration of a light image which includes image information which is generated by the image generating unit 11 are corrected. The holographic mirror 14 deflects the light which is emitted from the correcting optical system 13 to guide the light to the position of an exit pupil G, and transmits a portion of external light.

The holographic mirror 14 of the present embodiment corresponds to a deflecting optical system of the claims.

The image generating unit 11 is provided with a light source optical system 15, a mirror 16, and the light scanning device 17. The light source optical system 15 emits light which is generated by an internal semiconductor laser. The mirror 16 reflects the light which is emitted from the light source optical system 15 and turns back the optical path of the light. The light scanning device 17 scans the light which is reflected by the mirror 16.

The light source optical system 15 is provided with a light source unit 25, a pickup lens 26, an optical fiber 27, and a collimator lens 28. For example, the light source unit 25 is provided with a plurality of solid state light sources (not illustrated) including a semiconductor laser which emits red light, a semiconductor laser which emits green light, and a semiconductor laser which emits blue light. The colors of light which are emitted from the semiconductor lasers are modulated according to the image signal, the colors of light which are modulated are combined, and are emitted from the light source unit 25 as image light. The pickup lens 26 transmits the light which is emitted from the light source unit 25 to the optical fiber 27 of a later stage. The optical fiber 27 guides the light, which passes from the light source unit 25, through the pickup lens 26, and is incident on the optical fiber 27, to an optical system of a later stage. The collimator lens 28 parallelizes the light which is incident from the optical fiber 27.

The optical path of the light which is emitted from the light source optical system 15 is turned back due to the light being reflected by the mirror 16, and the light is guided to the light scanning device 17. In the case of the present embodiment, the mirror 16 is disposed to be inclined such that an optical path L2 of the light which is reflected by the mirror 16 is positioned on a side which is separated from the exit pupil G in relation to an optical path L1 of the light which is incident on the mirror 16. In other words, the mirror 16 is disposed to be inclined in an orientation at which a normal line V which extends from the reflecting surface extends in a direction distancing from the head portion H of the viewer. Accordingly, the optical path from the light source optical system 15 to the light scanning device 17 is turned back to a direction separating from a position close to the head portion H of the viewer.

The light scanning device 17 is provided with a MEMS mirror (not illustrated), for example. The light scanning device 17 causes the posture of the MEMS mirror to change according to a modulation operation of the light source optical system 15, and scans light two-dimensionally. In this manner, the light scanning device 17 emits light which includes image information.

The light which is emitted from the light scanning device 17 is incident on the pupil magnifying optical system 12. The pupil magnifying optical system 12 is provided with a plurality of parallel plates (not illustrated), and a plurality of half mirrors (not illustrated). The plurality of parallel plates are bonded via the half mirrors. The pupil magnifying optical system 12 are cut such that a pair of end surfaces are inclined in relation to the thickness direction of the parallel plates. The pair of end surfaces becomes a light entrance end surface 12a and a light exit end surface 12b, respectively. In this manner, the horizontal cross-sectional shape of the pupil magnifying optical system 12 is trapezoidal. The pupil magnifying optical system 12 is disposed in an orientation such that of the two sides which are parallel to each other in the trapezoid, the short side is positioned at the side which is close to the exit pupil G, and the long side is positioned at the side which is distant from the exit pupil G.

In the pupil magnifying optical system 12, after the light which is incident from the light entrance end surface 12a is repeatedly transmitted and reflected by the plurality of half mirrors, the light is emitted from the light exit end surface 12b. The width of the light which is emitted from the light exit end surface 12b is magnified with respect to the width of the light which is incident on the light entrance end surface 12a. The incidence angle of the light on the light entrance end surface 12a and the emission angle of the light from the light exit end surface 12b match. Therefore, for example, the light which is perpendicularly incident on the light entrance end surface 12a is perpendicularly emitted from the light exit end surface 12b, and the light which is incident on the light entrance end surface 12a at a predetermined incidence angle is emitted from the light exit end surface 12b at an emission angle which is equal to the incidence angle. Accordingly, when the light passes through the pupil magnifying optical system 12, the optical path bends to the short side of the trapezoid.

The correcting optical system 13 is provided between the pupil magnifying optical system 12 and the holographic mirror 14. The light which is emitted from the pupil magnifying optical system 12 is incident on the correcting optical system 13, and the correcting optical system 13 corrects aberration and distortion of the image which occurs due to the holographic mirror 14. The correcting optical system 13 is provided with a first correcting lens 21, a second correcting lens 22, and a third correcting lens 23, in order from the light entrance side. In the present embodiment, the correcting optical system 13 is configured using three lenses of the first correcting lens 21, the second correcting lens 22, and the third correcting lens 23; however, the number of correcting lenses is not particularly limited.

Among the three correcting lenses which form the correcting optical system, the first correcting lens 21 and the third correcting lens 23 have a wedge shape in which the thicknesses on the side which is close to the exit pupil G (that is, the head portion H of the viewer) are thick, and the thicknesses of the side which is distant from the exit pupil G are thin. In the present embodiment, an example is given in which the two correcting lenses have the wedge shape; however, the number of correcting lenses having the wedge shape is not necessarily limited to two, and at least one lens may have a wedge shape.

The holographic mirror 14 reflects the light which is emitted from the correcting optical system 13 toward the exit pupil G to generate an image, while transmitting a portion of the external light. The holographic mirror 14 has a volumetric hologram, and it is possible to arbitrarily adjust the incidence angle and the reflection angle of the light by changing the volumetric hologram pattern. Therefore, even if the holographic mirror 14 is disposed substantially in parallel with the front surface of the face of the viewer, it is possible to guide the light which is incident from the correcting optical system 13 at a large incidence angle to the exit pupil, that is, to the pupil of the viewer. An intermediate image is generated on the optical path between the correcting optical system 13 and the holographic mirror 14.

Figure 4:
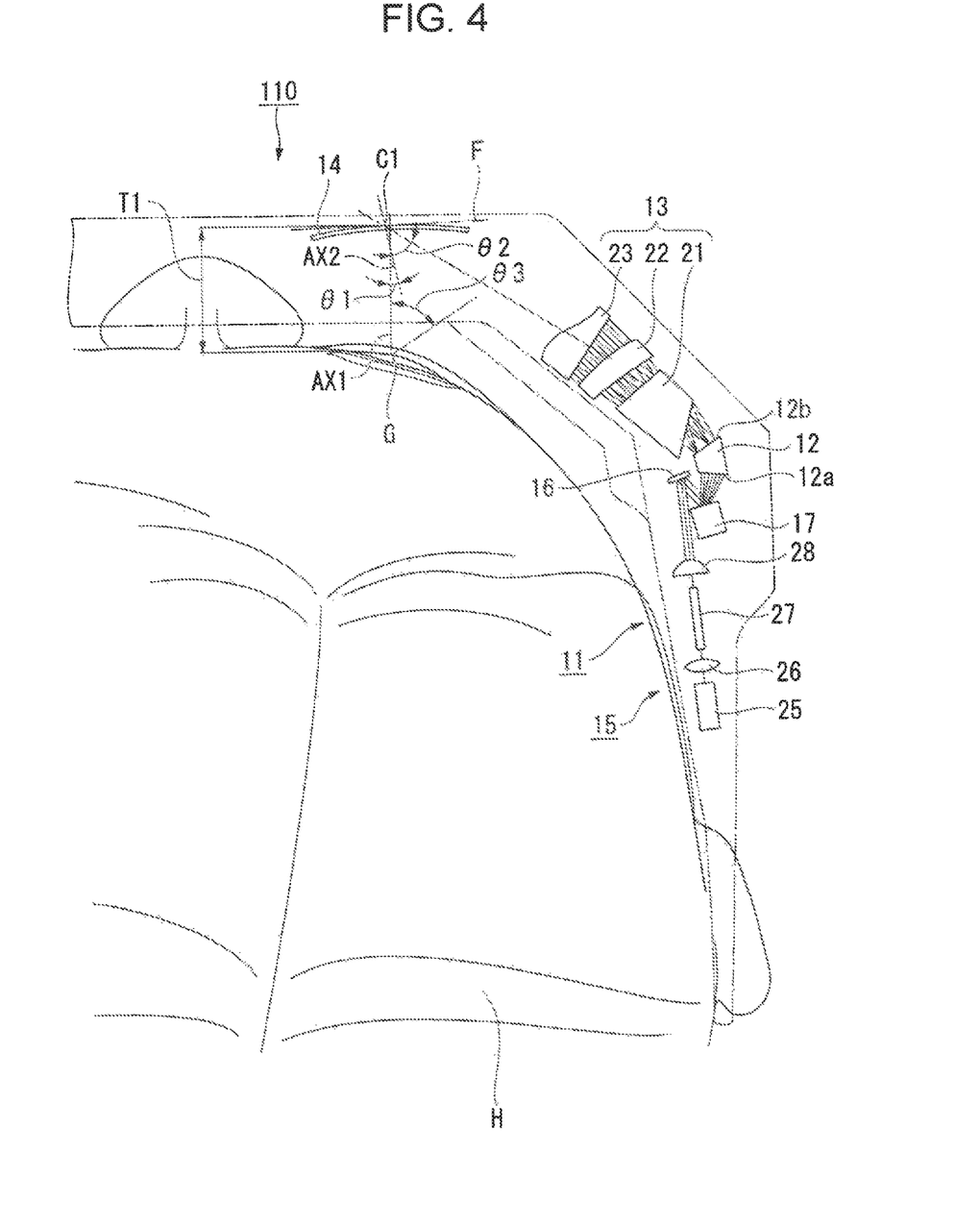
FIG. 4 is a plan view illustrating the positional relationship of portions of the image display device.

FIG. 4 is a plan view illustrating the positional relationship of portions of the display device 100.

As illustrated in FIG. 4, a tangential plane F which passes through a center C1 of the holographic mirror 14 is assumed. The holographic mirror 14 is disposed such that an angle θ1 which is formed by an optical axis AX1 of the exit pupil G and an axis AX2 which is perpendicular to the tangential plane F is less than or equal to 5°. Using this angle as a premise, the optical design between the holographic mirror 14 and the correcting optical system 13 is optimized. For example, when a general half mirror is used as the deflecting optical system, it is necessary to incline the deflecting optical system by 45° in relation to the optical axis AX1. To handle this, in the case of the present embodiment, since it is possible to dispose the holographic mirror 14 at an angle which is close to perpendicular in relation to the optical axis AX1 of the exit pupil G, it is possible to reduce the thickness of the image display unit 110 which is positioned in front of the eyes of the viewer.

A distance T1 from the exit pupil G to the center C1 of the holographic mirror 14 is set to be greater than or equal to 30 mm. Therefore, in a state in which the display device 100 is worn, the distance from the pupil of the viewer to the center C1 of the holographic mirror 14 becomes greater than or equal to 30 mm. According to this configuration, a space is secured for allowing light with a large diameter which is emitted from the correcting optical system 13 to be orthogonally incident on the holographic mirror 14. Accordingly, it is possible to guide the light of a wide angle of view range to the eyes of the viewer, and it is possible to view an image of a large size.

The correcting optical system 13 is disposed such that an angle θ2 formed by the optical axis AX1 of the exit pupil G and an optical axis AX3 of the correcting optical system 13 is greater than or equal to 55°. According to this configuration, it is possible to dispose the correcting optical system 13 separated to the diagonal rear of the holographic mirror 14. Accordingly, it is possible for the viewer to wear the display device 100 while still wearing ordinary (eyesight corrective) eyeglasses.

The correcting optical system 13 is disposed outside of a range at which an angle θ3 which is formed with the optical axis AX1 of the exit pupil G becomes 50°. Accordingly, other optical systems including the correcting optical system 13 are not disposed in a range within 50° in relation to the optical axis AX1 of the exit pupil G. Accordingly, the visual field of the viewer is sufficiently secured, and it is possible to obtain a favorable see-through property.

In the HMD 300 of the present embodiment, since the mirror 16 which reflects the light which is emitted from the light source optical system 15 is provided in the image generating unit 11, the optical path between the light source optical system 15 and the light scanning device 17 is turned back. Accordingly, it is possible to reduce the size of the image generating unit 11, and such, it is possible to reduce the size of the entirety of the display device 100.

The holographic mirror 14 occupies the front side of the head portion H of the viewer, and the side of the temporal region close to the ears of the viewer is occupied by the correcting optical system 13, the pupil magnifying optical system 12, the light scanning device 17, and the light source optical system 15. It is possible to sufficiently reduce the weight of the holographic mirror 14, whereas there is a limit to the reduction in weight of the other optical components. By positioning the optical system other than the holographic mirror 14 at the temporal region close to the ears of the viewer, the center of gravity of the display device 100 approaches a position close to the ear. Therefore, an effect may be obtained in that the display device 100 is stably and easily held on the head portion even when the viewer wears the display device 100 and moves the head portion, for example.

Since the pupil magnifying optical system 12 is positioned on the optical path between the light scanning device 17 and the correcting optical system 13, the pupil magnifying optical system 12 is configured so as not to be positioned in front of the eyes of the viewer. Accordingly, it is possible to secure a favorable see-through property while having a pupil magnifying function which is capable of reducing the influence of eye movement and interpupillary distance fluctuation. Although the diameter of the light which is incident on the holographic mirror 14 is increased by the action of the pupil magnifying optical system 12, even if the optical design of the holographic mirror 14 is optimized, the aberration and distortion may not be completely corrected, in particular, in a case in which the size of the image is large, that is, the angle of view is large, the quality of the image may be reduced. In this regard, since the HMD 300 according to the present embodiment is provided with the correcting optical system 13, the aberration and distortion which are caused by the holographic mirror 14 are corrected, and a high-quality image may be obtained. In this manner, according to the present embodiment, it is possible to provide an HMD with which it is possible to visually recognize an image while securing the see-through property regardless of eye movements and changes in interpupillary distance, with which it is possible to display a large-size image with high quality, and which is small, has excellent wearability, and has an excellent external appearance.

As described above, in the HMD 300 according to the present embodiment, by devising the orientation of the pupil magnifying optical system 12, the shape of a portion of the correcting lens which forms the correcting optical system 13, and the like, the optical path of the entirety of the optical system assumes a form which fits the face of the viewer. Since an intermediate image is generated on the optical path between the correcting optical system 13 and the holographic mirror 14, the light on the optical path is restricted, and there is little concern that the light will interfere with the head portion H. As a result, it is possible to cause the external shape of the display device 100 to fit the face, and it is possible to render the external appearance of the display device 100 slim.

The technical scope of the invention is not limited to the embodiments described above, and it is possible to add various modifications without departing from the gist of the invention.

For example, in the embodiment described above, a holographic mirror is used as the deflecting optical system; however, the deflecting optical system is not limited to a holographic mirror, and a deflecting optical system such as a Fresnel lens or a prism may be used, for example. In addition, appropriate changed may be made to the specific configurations of the portions of the image display device without being limited to the embodiments described above.

The entire disclosure of Japanese Patent Application No. 2014-203701, filed Oct. 2, 2014 is expressly incorporated by reference herein.

REFERENCE SIGNS LIST

12 . . . pupil magnifying optical system, 13 . . . correcting optical system, 14 . . . holographic mirror (deflecting optical system), 15 . . . light source optical system, 16 . . . mirror, 17 . . . light scanning device, 25 . . . light source unit, 27 . . . optical fiber, 28 . . . collimator lens.

The invention claimed is:

1. An image display device comprising:
   a light source optical system which emits a light;
   a mirror which reflects the light which is emitted from the light source optical system;
   a light scanning device which scans the light which is reflected by the mirror to use the light as image light;
   a pupil magnifying optical system which magnifies a beam diameter of the light which is emitted from the light scanning device;
   a correcting optical system on which the light which is emitted from the pupil magnifying optical system is incident and which corrects shape and aberration of the image light; and
   a deflecting optical system which deflects the light which is emitted from the correcting optical system to guide the light to a position of an exit pupil and transmits a portion of external light,
   wherein a cross-sectional shape of the pupil magnifying optical system is a trapezoid, and
   wherein the pupil magnifying optical system is disposed in an orientation such that of two sides which are disposed parallel to each other in the trapezoid, a short side is positioned at a side which is close to the exit pupil, and a long side is positioned at a side which is distant from the exit pupil.

2. The image display device according to claim 1, wherein the deflecting optical system is formed of a holographic mirror.

3. The image display device according to claim 1, wherein the correcting optical system is provided with a plurality of lenses, and
   wherein at least one lens among the plurality of lenses has a wedge shape in which a thicknesses on a side which is close to the exit pupil is thick, and a thicknesses of a side which is distant from the exit pupil is thin.

4. The image display device according to claim 1, wherein the mirror is disposed to be inclined such that an optical path of the light which is incident from the light source optical system and is reflected by the mirror is positioned on a side which is separated from the exit pupil in relation to an optical path of the light which is incident on the mirror.

5. The image display device according to claim 1, wherein the light source optical system includes a light source unit, an optical fiber which propagates the light from the light source unit, and a collimator lens onto which the light which is emitted from the optical fiber is incident.

* * * * *